US009523039B2

(12) United States Patent
Coolidge et al.

(10) Patent No.: US 9,523,039 B2
(45) Date of Patent: Dec. 20, 2016

(54) UPGRADING COAL AND OTHER CARBONACEOUS FUELS USING A LEAN FUEL GAS STREAM FROM A PYROLYSIS STEP

(71) Applicant: Shenhua Group Corporation Limited, Beijing (CN)

(72) Inventors: Dennis W. Coolidge, Palm Coast, FL (US); Deane A. Horne, Toledo, OH (US); Ronn G. Smith, Sheridan, WY (US); Leslie C. White, Boise, ID (US)

(73) Assignees: Shenhua Group Corporation Limited, Beijing (CN); National Institute Of Clean-And-Low Carbon Energy, Beijing (CN)

( * ) Notice: Subject to any disclaimer, the term of this patent is extended or adjusted under 35 U.S.C. 154(b) by 0 days.

(21) Appl. No.: 14/608,899

(22) Filed: Jan. 29, 2015

(65) Prior Publication Data

US 2015/0136579 A1 May 21, 2015

Related U.S. Application Data

(62) Division of application No. 13/180,757, filed on Jul. 12, 2011, now Pat. No. 9,005,322.

(51) Int. Cl.

| | |
|---|---|
| ***C10B 21/02*** | (2006.01) |
| ***C10B 53/04*** | (2006.01) |
| ***C10L 9/08*** | (2006.01) |
| ***F23K 1/04*** | (2006.01) |
| ***C10B 49/02*** | (2006.01) |
| ***F23N 3/04*** | (2006.01) |
| ***F23N 5/00*** | (2006.01) |

(52) U.S. Cl.
CPC .............. *C10B 21/02* (2013.01); *C10B 49/02* (2013.01); *C10B 53/04* (2013.01); *C10L 9/08* (2013.01); *F23K 1/04* (2013.01); *F23N 3/042* (2013.01); *F23N 5/006* (2013.01); *F23K 2900/01041* (2013.01); *Y02T 50/677* (2013.01)

(58) Field of Classification Search
CPC .................................. C10B 21/02; F23K 1/04
See application file for complete search history.

(56) References Cited

U.S. PATENT DOCUMENTS

| | | | |
|---|---|---|---|
| 1,814,980 | A | 7/1931 | Thomas |
| 1,976,908 | A | 10/1934 | Wittenberg |

(Continued)

OTHER PUBLICATIONS

Berkowitz, "An Introduction to Coal Technology", 1994, 2nd Edition, pp. 102-103; 164-165.

(Continued)

*Primary Examiner* — Matthew Merkling
(74) *Attorney, Agent, or Firm* — Volpe and Koenig, P.C.

(57) ABSTRACT

A method for upgrading coal and other carbonaceous fuels includes subjecting the carbonaceous fuel to a pyrolyzing process, thereby forming upgraded carbonaceous fuel and a flow of lean fuel gases. Auxiliary fuel is combusted in an auxiliary fuel combustor to produce auxiliary fuel combustion gases, and the lean fuel gases are heated with the auxiliary fuel combustion gases. The heated lean fuel gases are combusted in a lean fuel combustor, thereby producing a gas stream of products of combustion, and at least a portion of the gas stream of products of combustion are directed to the pyrolyzer.

9 Claims, 2 Drawing Sheets

To Other Processing Steps
Pyrolyzer
Auxiliary Fuel Combustor
Lean Fuel Combustor
Controller

(56) References Cited

U.S. PATENT DOCUMENTS 2,029,883 A 2/1936 MacCubbin et al.
2,040,100 A 5/1936 Miller
2,044,764 A 6/1936 Bywater
2,260,072 A 10/1941 Wilton
2,366,900 A 1/1945 Weir
2,528,553 A 11/1950 Royster
2,639,409 A 5/1953 Cobine
2,666,796 A 1/1954 Gorin et al.
2,748,063 A 5/1956 Radasch et al.
2,774,716 A 12/1956 Kulik
3,010,893 A 11/1961 Kulik
3,375,175 A 3/1968 Eddinger et al.
3,463,310 A 8/1969 Ergun et al.
3,574,065 A 4/1971 Eddinger et al.
3,585,732 A 6/1971 Itahashi
3,736,233 A 5/1973 Sass et al.
3,938,966 A 2/1976 Kingdig et al.
4,028,219 A 6/1977 Baldwin et al.
4,036,603 A 7/1977 Bernet et al.
4,052,170 A 10/1977 Yan
4,119,523 A 10/1978 Baldwin et al.
4,146,367 A 3/1979 Hsu
4,149,939 A 4/1979 Solano
4,156,595 A 5/1979 Scott et al.
4,213,826 A 7/1980 Eddinger et al.
4,234,386 A 11/1980 Stirling
4,263,124 A 4/1981 Wickstrom et al.
4,322,222 A 3/1982 Sass
4,341,598 A 7/1982 Green
4,395,309 A 7/1983 Esztergar
4,411,766 A 10/1983 Garg et al.
4,411,767 A 10/1983 Garg
4,445,842 A * 5/1984 Syska ...................... F23C 9/00 431/115
4,466,362 A 8/1984 Maxwell et al.
4,534,847 A 8/1985 Roberts et al.
4,605,790 A 8/1986 Wojtkowski
4,678,478 A 7/1987 Kelland
4,768,446 A 9/1988 Wilkes et al.
4,834,650 A 5/1989 Docherty et al.
4,961,389 A 10/1990 Pillsbury
5,017,283 A 5/1991 Oder
5,087,269 A 2/1992 Cha et al.
5,114,700 A 5/1992 Meihack et al.
5,127,586 A 7/1992 Oder
5,151,159 A 9/1992 Wolfe et al.
5,171,406 A 12/1992 Shang et al.
5,176,260 A 1/1993 Oder
5,240,592 A 8/1993 Meyer et al.
5,326,457 A 7/1994 Stipanovich, Jr.
5,372,497 A 12/1994 Coolidge et al.
5,373,648 A 12/1994 Wolf
5,401,364 A 3/1995 Rinker
5,496,465 A 3/1996 Fraas
5,547,549 A 8/1996 Fraas
5,601,692 A 2/1997 Rinker et al.
5,711,769 A 1/1998 Rinker et al.
5,730,069 A 3/1998 Coolidge et al.
5,997,289 A 12/1999 Dover
8,470,134 B2 * 6/2013 Rinker .................... C10B 51/00 201/29
2003/0118962 A1 6/2003 Munzner et al.
2004/0065307 A1 4/2004 Fiveland et al.
2007/0272538 A1 11/2007 Satchell
2008/0116052 A1 5/2008 Eatough et al.
2009/0119981 A1 5/2009 Drozd et al.
2011/0011719 A1 1/2011 Rinker
2011/0011720 A1 1/2011 Rinker

OTHER PUBLICATIONS

Dadayburjor et al., "Coal Conversion Processes Liquefaction," Kirk-Othmer Encyclopedia of Chemical Technology, 2003, vol. 6, pp. 851-856.
Kreith, "Principles of Heat Transfer", 2nd Edition, 1965, pp. 236-238.
Mahajan et al., "Low-temperature Air Oxidation of Caking Coals. 1. Effect on subsequent reactivity of chars produced", Fuel, 1980, vol. 59, pp. 3-10.
Oder, Dry Magnetic Separation of Ash, Sulfur and Mercury From a Southwestern Wyoming Coal, presented at the 18th International Low Rank Fuels Symposium, Jun. 24-26, 2003, Billings, Mt, pp. 1-6.
International Search Report and Written Opinion, Application No. PCT/US2010/041918, Dated Feb. 24, 2011.
International Search Report and Written Opinion, Application No. PCT/US11/51927, Dated Mar. 27, 2012.
International Search Report, Application No. PCT/US2012/039598, Dated Dec. 28, 2012.
International Search Report, Application No. PCT/US2012/044880, dated Jan. 29, 2013.
Written Opinion of the International Searching Authority, Application No. PCT/US2012/039598, Dated Dec. 28, 2012.
Written Opinion, Application No. PCT/US2012/044880, dated Jan. 29, 2013.

* cited by examiner

UPGRADING COAL AND OTHER CARBONACEOUS FUELS USING A LEAN FUEL GAS STREAM FROM A PYROLYSIS STEP

RELATED APPLICATIONS

This application is a Divisional application of U.S. patent application Ser. No. 13/180,757, filed Jul. 12, 2011, and entitled UPGRADING COAL AND OTHER CARBONACEOUS FUELS USING A LEAN FUEL GAS STREAM FROM A PYROLYSIS STEP, all of which is incorporated in the present application in its entirety.

TECHNICAL FIELD

This invention relates to a method of processing coal and other carbonaceous fuels to improve its thermal content when subjected to a subsequent combustion process. More particularly, this invention pertains to a process and apparatus for removing volatiles from coal and other carbonaceous fuels to increase its thermal energy content. This invention relates to a benefication process for treating carbonaceous materials, such as treating noncaking, noncoking coal to form char, and such as treating oil shale, to produce synthetic crude oil.

BACKGROUND OF THE INVENTION

A principal objective of coal benefication is to increase the calorific heating value or amount of thermal energy of the coal that can be released during a subsequent combustion process. One method of increasing the thermal energy released during combustion of coal is to decrease the amount of moisture by subjecting the coal to a drying process. It will be appreciated that moisture in coal has no heating value and, although not environmentally harmful, facilitates depletion because evaporation of the moisture consumes a portion of thermal energy released during combustion of coal.

Another known method of increasing the thermal energy released during combustion of coal is to decrease the amount of volatile matter within the coal, and thereby increase the relative amount of fixed carbon in the coal. The amount of volatile matter within coal may be decreased by subjecting the coal to a pyrolysis process. Pyrolysis of coal in an oxygen deficient atmosphere removes volatile matter, e.g. low boiling point organic compounds and some heavier organic compounds, by breaking chemical bonds during the heating process. Breaking chemical bonds within coal during the heating process increases the relative percentage of elemental carbon that provides most of the calorific heating value when the coal is burned.

Various aspects of conventional coal upgrading processes require a supply of fuel for providing the heat necessary to operate the process. In regions lacking a readily available supply of natural gas, the fuel must be shipped to the coal processing site, or alternate fuels must be used. Each of these substitute fuels can present problems in operating an efficient coal upgrading process.

When raw coal is subjected to a pyrolysis process, the resulting stream of volatiles is often subjected to a condensation process to remove tars and oils as a valuable byproduct of the coal treating process. In some cases the volatiles stripped from the coal in the pyrolysis process are used as fuel in the overall coal treating process. In many cases the volatiles stripped from the coal are a lean fuel, and have varying properties over time, i.e., an inconsistent chemical composition and calorific heating value over time. It would be helpful if there could be developed an improved coal upgrading process where the lean fuel volatiles from a pyrolysis step can be efficiently and reliably used as fuel source in the overall coal processing operation.

SUMMARY OF THE INVENTION

According to this invention there is provided a method and apparatus for upgrading coal and other carbonaceous fuels including subjecting the carbonaceous fuel to a pyrolyzing process, thereby forming upgraded carbonaceous fuel and a flow of lean fuel gases. Auxiliary fuel is combusted in an auxiliary fuel combustor to produce auxiliary fuel combustion gases, and the lean fuel gases are heated with the auxiliary fuel combustion gases. The heated lean fuel gases are combusted in a lean fuel combustor, thereby producing a gas stream of products of combustion, and at least a portion of the gas stream of products of combustion are directed to the pyrolyzer.

According to this invention there is also provided a method of upgrading coal and other carbonaceous fuels, including subjecting the carbonaceous fuel to a pyrolyzing process, thereby forming upgraded carbonaceous fuel and a flow of lean fuel gases. The flow of lean fuel gases and a flow of primary combustion air are directed into a lean fuel combustor, and the lean fuel gases are combusted in the lean fuel combustor, thereby producing a gas stream of products of combustion. The oxygen concentration of the gas stream of the lean fuel combustion process is measured, and the flow rate of the primary combustion air into the lean fuel combustor is controlled in response to the measured concentration of oxygen in the gas stream of the lean fuel combustion process.

According to this invention there is also provided a method of upgrading coal and other carbonaceous fuels, including subjecting the carbonaceous fuel to a pyrolyzing process, thereby forming upgraded carbonaceous fuel and a flow of lean fuel gases. The flow of lean fuel gases and a flow of primary combustion air is directed into a lean fuel combustor, and the lean fuel gases are combusted in the lean fuel combustor, thereby producing a gas stream of products of combustion. At least a portion of the gas stream is introduced into the flow of primary combustion air. The temperature of the flow of lean fuel and the flow of primary combustion air introduced into the lean fuel combustor is determined, and the flow rate of the introduced portion of the gas stream is controlled in response to the temperature of the flow of lean fuel gases and the flow of primary combustion air.

According to this invention there is also provided a method of upgrading coal and other carbonaceous fuels, including subjecting the carbonaceous fuel to a pyrolyzing process, thereby forming upgraded carbonaceous fuel and a flow of lean fuel gases. The flow of lean fuel gases and a flow of primary combustion air are directed into a lean fuel combustor. The lean fuel gases are combusted in the lean fuel combustor, thereby producing a gas stream of products of combustion, and at least a portion of the gas stream is introduced into the flow of primary combustion above-identified. The remainder of the gas stream is directed to the pyrolyzer, wherein at least about 60% of the heat provided to the pyrolyzer is provided by the combustion of the lean fuel gases from the pyrolyzer, with the remainder of the heat being provided by the auxiliary fuel combustor.

Various advantages of this invention will become apparent to those skilled in the art from the following detailed description of the preferred embodiment, when read in light of the accompanying drawings.

DETAILED DESCRIPTION OF THE INVENTION

Figure 1:
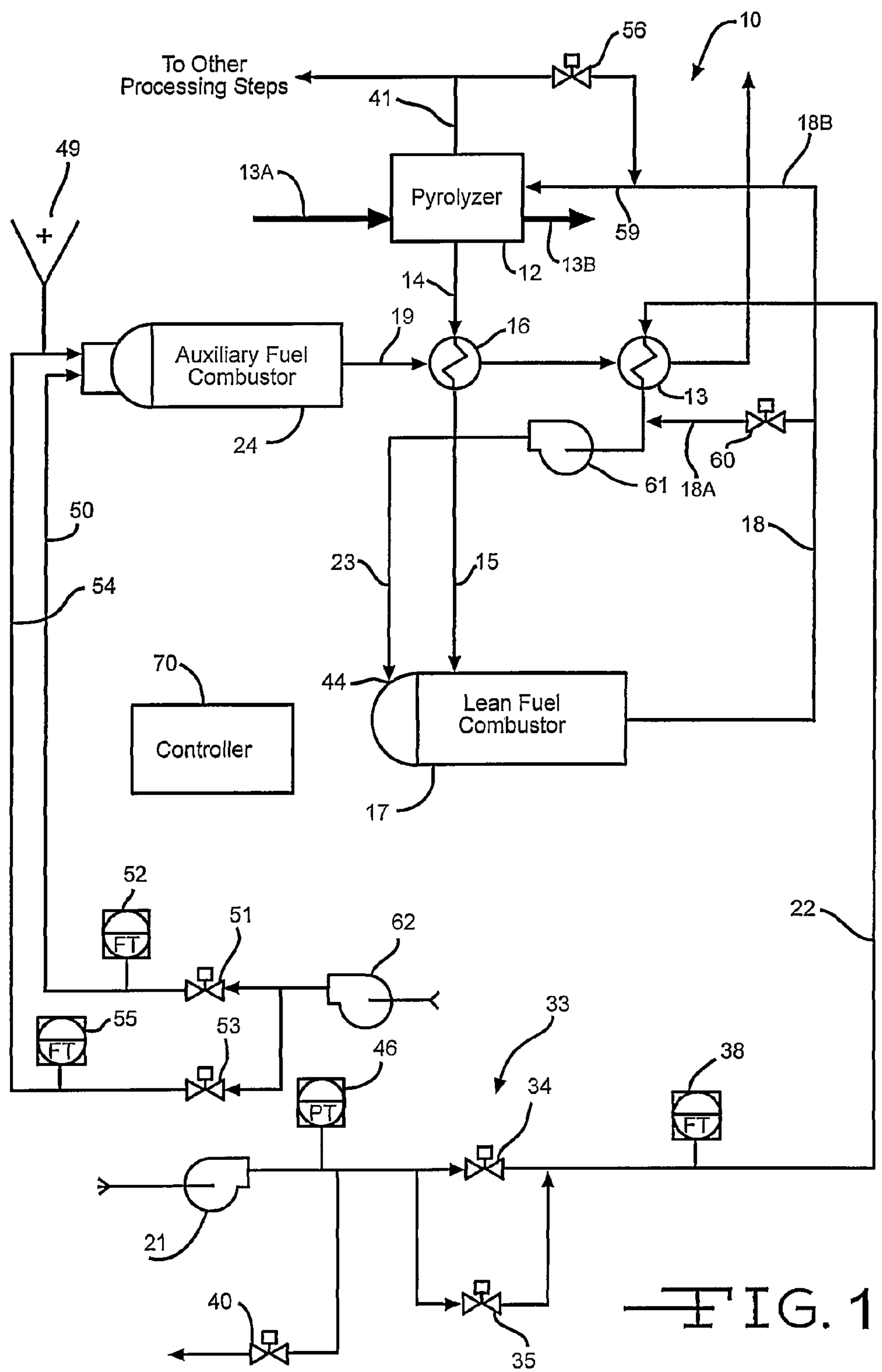
FIG. 1 is a schematic view of apparatus and a process for treating low calorific coal and other carbonaceous fuels.

One widely known method of processing low rank coal is to decrease the amount of volatile matter within the coal by subjecting the coal to a pyrolysis process. Volatile material from the pyrolysis process can be converted to valuable liquid fuels and other by-products, and a stream of lean fuel gas. This stream of lean fuel can be used as a source of fuel for the coal treating process, but is necessary to supply auxiliary heat to supplement any heat generated by internal heat sources and to ensure that internally generated fuels can be properly combusted.

As is well known by those skilled in the art of coal processing, many locations with a rich carbonaceous material resource, such as coal and oil shale, do not also have a ready supply of high heating value support fuel. U.S. Pat. No. 5,730,069 describes a coal treating process in which a high heating value support fuel consisting of natural gas is used to assist in the combustion of a low heating value primary fuel. The use of transportable fuels such as propane, liquefied petroleum gas (LPG), or low ash fuel oils is not cost effective due to the cost of transporting and storing such auxiliary fuels for use at the carbonaceous material processing site. Therefore it is desirable to use as much of the internally generated fuel as possible in the overall coal treating process.

Those people skilled in the art of material processing will also realize that fuels containing mineral matter are not suitable for use as a direct support fuel due to the potential plugging of the material processing equipment by the ash generated by the combustion process. Also, such fuels are difficult to burn in a low excess air combustor.

Besides coal, another mineral requiring processing for efficient use of the fuel derived from the mineral is oil shale. A principal objective of oil shale processing is to release the entrapped kerogen to produce synthetic crude oil. One method of releasing the kerogen from the shale is to treat the crushed and sized shale with high sensible heat, oxygen deficient process gas.

Although various methods of processing carbonaceous materials such as noncaking, coal and oil shale are known, many of the known methods require large volumes of high temperature continuously flowing streams of oxygen deficient gas for convective heat transfer. An oxygen deficient gas as used in this specification refers to a gas comprising less than about 0.5% oxygen by weight.

Oxygen deficient gas streams typically have been produced using such air separation technologies as cryogenic distillation, membrane separation and pressure swing absorption. Although the known methods of producing oxygen deficient gas streams for coal drying and mild gasification processes have been proven to perform satisfactorily in certain applications, these technologies are not cost effective when considered for large processing needs like mild coal gasification, coke preheating and the like. Large mild coal gasification systems may range up to about 8,000 square feet (about 750 square meters) or more, and may require an amount of oxygen deficient gas within the range of from about 5,000 to about 10,000 standard cubic feet of oxygen deficient gas per hour per square foot (1,440 to about 2,880 normal cubic meter of oxygen deficient gas per hour per square meter) of cross section for thermal treatment of coal and/or oil shale whether the coal and/or oil shale is to be dried or fractioned into solid and gaseous phase components.

Using the process disclosed here, high value auxiliary fuel such as natural gas, LPG, and low ash fuel oils can be replaced with a low value fuel such as coal fines to stabilize the combustion of the lean fume in the lean fuel combustor. This is accomplished with an auxiliary fuel combustor which indirectly heats the lean fuel and lean fuel combustion air to above the auto ignition point. Direct injection of the low value fuel into the lean fuel combustor is not advantageous because of the associated fly ash that will be trapped in the processed coal leaving the pyrolyzer. Associated with this change is the control scheme to manage the process. The apparatus for carrying out this process is also disclosed.

Figure 2:
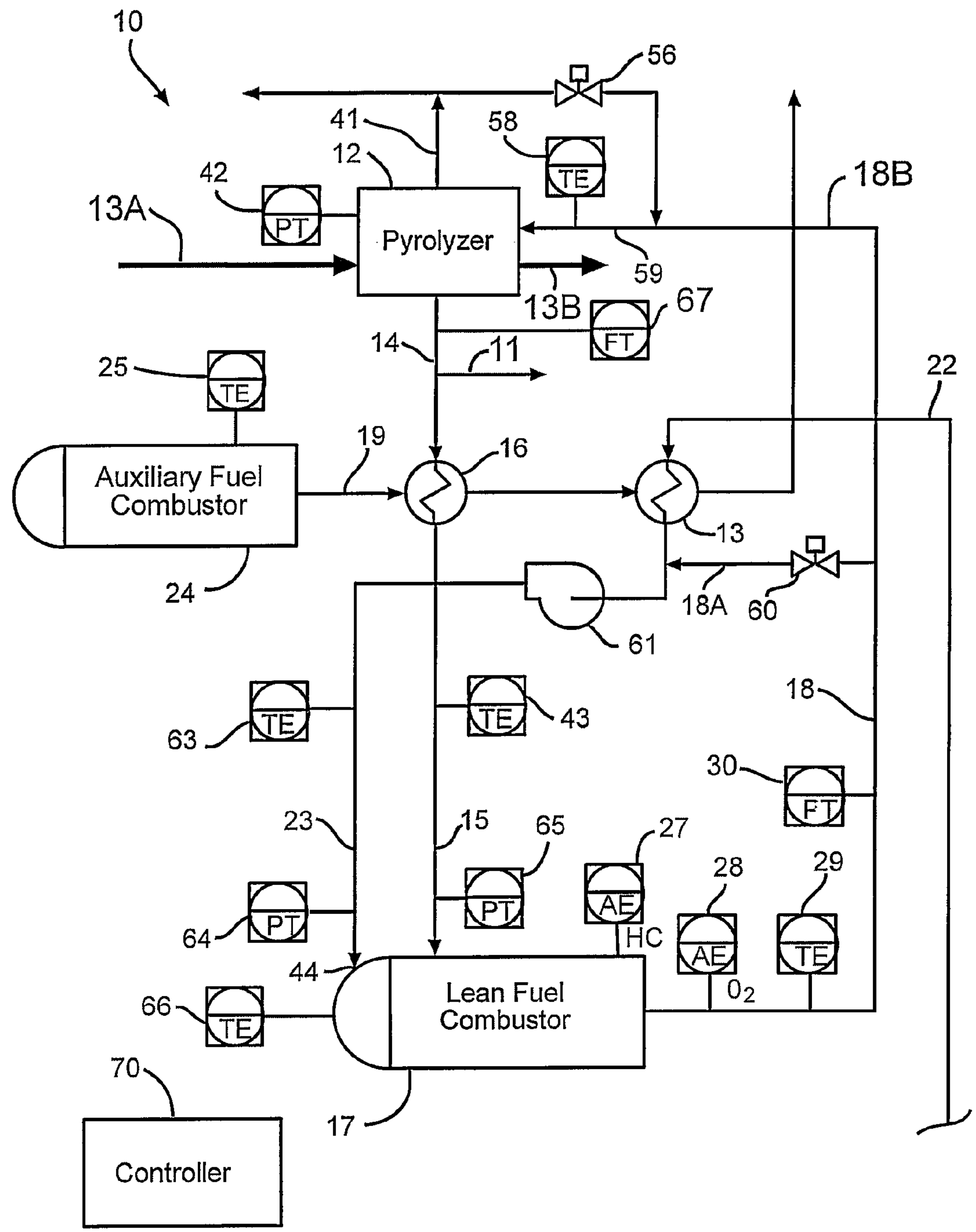
FIG. 2 is an enlarged view of a portion of FIG. 1.

As shown in FIGS. 1 and 2, a processing system 10 for carbonaceous material such as coal includes a pyrolyzer 12 which is used for treating a stream of coal, indicated at 13A. The pyrolyzer 12 produces coal char 13B having a higher percentage of elemental carbon than the raw input coal. The pyrolysis process also produces a pyrolyzer effluent stream of gas 14, which is also referred to as a lean fume gas stream or lean fume fuel. Optionally, liquids and tars can be removed from the pyrolyzer effluent stream of gas 14, as shown at 11. The pyrolyzer effluent stream 14 is directed to a lean fuel combustor 17 to burn hydrocarbon components from the gas stream 14 exiting the pyrolyzer 12 and also to supply heat back to the pyrolyzer 12. In this embodiment, pyrolyzer 12 is operated for the purpose of heating carbonaceous material such as non caking, non coking coal or oil shale. It will be appreciated, however, that this apparatus may be used with any process requiring the burning of hydrocarbons in a gas stream and the recovery of sensible heat.

Pyrolyzer effluent gas stream 14 is the lean hydrocarbon gas stream produced in the form of volatile components that evolve as the carbonaceous material is heated in the main pyrolysis process, i.e., in the pyrolyzer 12. The effluent gas stream 14 is passed through an indirectly fired heat exchanger 16 to increase the temperature of the lean fuel gases. The heat exchanger 16 is heated by hot gases from an auxiliary fuel combustor 24. The auxiliary fuel combustor 24 burns fossil fuel which can be auxiliary fuels such as propane or various grades of fuel oil, or internally generated fuels such as coal fines. The auxiliary fuel combustor 24 is operated with excess air to assure complete combustion of the fuel. The combustion gases 19 from the auxiliary fuel combustor 24 have a temperature within the range of from about 1,900° F. to about 2,300° F. (1,040 to 1,300° C.), although the temperature can be higher or lower. In one embodiment, the temperature can be within the range of from about 2000° F. to about 2,200° F. (1090° to 1,200° C.).

The heat exchanger 16 is provided to use the combustion gases 19 from the fuel combustor 24 to heat the effluent gas stream 14 to a temperature above about 1400° F. (about 760° C.). In one embodiment the effluent gas stream 14 is heated to a temperature within the range of from about 1,400° F. to about 1,600° F. (about 760° C. to about 870° C.). In a specific embodiment the effluent gas stream 14 is heated to a temperature of about 1,500° F. (about 816° C.). The heated effluent stream 15 is then directed to the lean fuel combustor 17.

As shown, a stream of primary combustion air 22 is supplied to the lean fuel combustor 17. The flow of primary combustion air 22 is driven by air blower 21. Before the combustion air 22 is delivered to the lean fuel combustor 17, it is heated to a temperature within the range of from about 300° F. to about 500° F. (about 150° C. to about 260° C.) by a secondary heat exchanger 13. In other embodiments the air flow 22 is heated to higher temperatures. The secondary heat exchanger 13 is supplied with waste heat from the indirectly fired heat exchanger 16. The heat exchanger 13 raises the temperature of the combustion air stream 22 and produces a hot primary combustion air stream 23. Optionally the hot primary air is routed through a booster blower 61 to maintain an acceptable level of pressure for the hot primary gas stream 23 after any possible pressure loss in the heat exchanger 13. Although the embodiment shown includes the heat exchanger 16 being upstream of the heat exchanger 13 with respect to the combustion gases 19 from the auxiliary heat exchanger 17, it is to be understood that the heat exchangers 13 and 16 could be reversed. The heat exchanger 13 for the combustion air could be first in line to receive the combustion gases 19, with the heat exchanger 16 being secondary, supplied with waste heat from the heat exchanger 13.

In the lean fuel combustor 17 the fuel from the heated effluent stream 15 exiting the heat exchanger 16 is mixed with the hot primary combustion air 23 and combusted. A combustor gas stream, indicated by reference numeral 18, is a hot gas stream exiting from combustor 17. This gas stream contains little or no hydrocarbons, and has a low oxygen content. In one embodiment the oxygen content is within the range of from about 0.2% to about 0.8%, and is therefore, practically speaking, inert. The temperature of the combustor exit gas stream 18 exiting the combustor 17 is typically within the range of from about 1,800° F. to about 2,200° F. (about 980° C. to about 1,200° C.), although it can be higher or lower. In one embodiment the exit gas stream is within the range of from about 1,950° F. to about 2,050° F. (about 1,070° C. to about 1,120° C.).

A portion of combustor exit stream 18 is re-circulated back to the lean fuel combustor 17 through bypass line 18A. The amount of combustion gases recirculated though bypass line 18A is controlled by valve 60, and is in part affected by the draw of booster blower 61. The remaining portion of gas stream 18 not flowing through the bypass line 18A is directed back to the pyrolyzer 12 via line 18B to heat the carbonaceous material. Consequently, a portion of the recovered heat generated by combustion of the volatiles in the lean fuel combustor 17 is used as an integral part the pyrolyzing process in the pyrolyzer 12. In one embodiment at least about 60% of the heat required in the pyrolyzer 12 is provided by the combustion of volatiles in pyrolyzer effluent stream 14 while the remainder of the heat is provided by the auxiliary fuel combustor 24. In another embodiment, at least about 70% of the heat required in the pyrolyzer 12 is provided by the combustion of volatiles in pyrolyzer effluent stream 14, with the remainder being provided by the auxiliary fuel combustor 24. In a specific embodiment, the amount of heat provided by the combustion of volatiles in the pyrolyzer effluent stream 14 is within the range of from about 70% to about 90%, with the remainder of the heat being provided by the auxiliary fuel combustor 24.

As disclosed above, the high-temperature booster blower 61 is provided to increase the pressure of the mixture (indicated at 23) of the air from stream 22 and re-circulated hot gas from stream 18A for injection into the fume combustor 17. The temperature of the mixture of gases entering booster blower 61 is within the range of from about 1,400° F. to about 1,500° F. (760 to 820° C.°), although it can be higher or lower. In one embodiment the mixed temperature is within the range of from about 1,350° F. to about 1,600° F. (730 to 780° C.°). The purpose of re-circulating a portion of the combustor flue gas 18 through line 18A is to keep the mixed mean temperature of gas stream 23 and heated effluent stream 15 above the ignition temperature of approximately 1,450° F. (790° C.). This results in spontaneous ignition of the lean fumes of the heated effluent stream 15 when that stream is mixed with the air/recycled-gas 23 in the combustor 17. In some instances the ignition temperature is higher or lower than 1,450° F. (790° C.). It would be advantageous if the incoming fuel and air/oxygen substantially constantly exceeds the ignition temperature to avoid instances of no ignition in the lean fuel combustor 17. It is to be understood that the mixing of the air/recycled-gas 23 and the heated effluent stream 15 can occur either within the lean fuel combustor 17, or shortly before the air and gas are introduced to the lean fuel combustor 17.

Control of re-circulated gas flow through bypass line 18A is achieved by means of temperature control valve 60, which responds to a computed gas/air mixture temperature at the inlet of combustor 17. This temperature can be determined in a number of ways. In one embodiment, the temperature is measured with a temperature element, such as a thermocouple or temperature element 66 associated with the combustor 17. The measured temperature is received by a controller 70, and a signal is sent to the control valve 60. In another embodiment this temperature is computed from some or all of five different factors:

1) the gas flow rate of combustor flue gas 18 measured by flow transmitter 30,
2) a flow rate measurement of the pyrolyzer effluent stream 14 by a flow transmitter 67,
3) a lean gas stream temperature measured by temperature element 43 for heated effluent stream 15,
4) a re-circulated gas flow rate determined by the position of control valve 60 for the portion of gas flow stream 18 that is recirculated through line 18A, and
5) a mixed lean fume/gas temperature measured by temperature element 63 for flow stream 23.

Any suitable devices for measuring these flows and temperatures can be used. The measurements can be sent to the controller 70, which can be programmed to receive and store data and to include software for operation of various components of the system. The position of control valve 60 is adjusted by the controller 70 to force this calculated temperature to exceed the ignition temperature by some pre-determined safety factor. In one embodiment, the system is operated so that the temperature of the air/gas mixture in line 23 and the lean fuel in line 15 entering the lean fuel combustor 17 are set to exceed the ignition temperature by at least about 50° F. (10° C.). The safety factor reflects uncertainties in the measurement system. The control valve 60 can be set manually or can be controlled by signals from the controller 70.

In the system disclosed the temperature and oxygen concentration within the combustor 17 are controlled for efficient and trouble free operation. One of the control aspects available in this system is that the temperature and flow rate of the exhaust 19 from the auxiliary fuel combustor 24 can be controlled to manage the temperature of the heated effluent stream 15. The auxiliary fuel combustor 24 can be set to produce a gas stream 19 whose temperature is limited only because it must not exceed the metallurgical limits of the heat exchanger 16. The flow rate and temperature of gas stream 19 in turn determine the amount of heat transferred to the lean gas stream 14 via the heat exchanger 16. For example if the temperature as indicated by temperature element 43 of the heated effluent stream 15 is lower than desired then the control system would cause valves 51 and 53 to open to bring more combustion fuel and air, respectively, to the auxiliary fuel burner 24. The increased mass flow in combustion air streams 50 and 54, driven by air blower 62, would be sensed by the flow transmitters 52 and 55, respectively. The controller 70 would also control the opening of valves 53 and 51 in a manner such that the ratio of flows in air streams 50 and 54 would remain substantially constant, although the controller could be programmed to vary the ratio if desired.

Operating valve 53 to open the valve further would increase the flow in air flow line 54, which in turn would entrain more fossil fuel from fuel supply 49. At the same time valve 51 would be opened by an amount sufficient to keep the air-to-fuel ratio in the auxiliary fuel combustor 24 constant. The increase in flow of air and fuel into the auxiliary fuel combustor 24 has the effect of providing hotter gases and a greater mass flow to the lean fuel heat exchanger 16. This in turn increases the heat supplied to the effluent stream 14 in the heat exchanger 16. Although the system 10 shows the supply of fuel 49 to the auxiliary fuel combustor 24 to be via entrainment from the flow 54, it is to be understood that the flow of fuel 49 could be controlled and introduced to the auxiliary fuel combustor by any other suitable means.

The temperature in the auxiliary fuel combustor 24 is indicated by temperature element 25. This temperature could be increased if necessary by opening valve 53 which would cause more fuel to be brought into the combustor. The temperature of the auxiliary fuel combustor 24 must be controlled such that heat exchanger 16 does not exceed its safe operating temperature. In the embodiment shown, control of the temperature of exhaust 19 is effected by or achieved by the pre-set air-to-fuel ratio and resulting constant excess air in auxiliary fuel combustor 24. The air-to-fuel ratio set point could be modified either manually or automatically to account for variations in the auxiliary fuel quality. For example, if the heat density of the auxiliary fuel were to increase, auxiliary fuel combustor 24 would burn hotter and the temperature of exhaust 19 would increase. In response to such an increase, as sensed by temperature element 25, the controller could be programmed to raise the air-to-fuel ratio set point, increasing the excess air in fossil fuel combustor 24 and lowering the temperature of exhaust 19 to its original set point. Alternatively, combustion air valve 51 could be controlled directly by temperature element 25 in order to increase the flow of air in line 50, thereby restricting the temperature of the exhaust gas 19 entering heat exchanger 16. This method would indirectly control the air-to-fuel ratio.

The oxygen concentration of the gases of the lean fuel combustor exit stream 18 can be controlled in part by a two-stage air flow control system 33 placed on the combustion air stream 22. As shown, an air flow valve 34 and a trim air flow valve 35 are provided in combustion air line 22. Also, an oxygen concentration analyzer 28 is provided downstream of the lean fuel combustor 17 to assess the oxygen concentration in the combustor exit stream 18. Valves 34 and 35 are managed partially in response to the oxygen concentration determined by analyzer 28 in combustion exit stream 18 to control the proper amount of primary combustion air added via hot primary gas stream 23 to the incoming heated effluent stream 15 directly into combustor 17. The flow of air flowing through valves 34 and 35 is gauged by the flow transmitter 38. The oxygen concentration in gas stream 18 is measured by oxygen concentration analyzer 28 and the data from analyzer 28 is supplied to the controller 70. The error between the desired oxygen concentration (set point) and the actual or measured oxygen concentration is used to calculate a position for trim flow valve 35, and an appropriate signal is sent to valves 34 and 35. Valve 35 makes small adjustments in primary air flow to maintain the set point oxygen concentration in the combustor close to a desired set point. Air flow valve 34 supplies the largest quantity of primary air through combustion air line 22. In one embodiment air flow valve 34 operates in a slave mode to trim air valve 35. When trim air valve 35 opens to a selected position, air flow valve 34 slowly opens to supply more air. Conversely, when trim air flow valve 35 closes to a predetermined position, air flow valve 34 slowly closes to supply less air to the combustor.

In one example, in the pyrolyzer 12 for pyrolyzing coal, valve 34 is a 16 inch diameter (about 40 cm) actuated butterfly valve used to supply most of the primary air. Trim air valve 35 is an 8 inch (about 20 cm) actuated butterfly valve. When trim valve 35 reaches 60 percent open, valve 34 starts to step open from its current position and continues to step open until either: a) valve 35 closes to less than or equal to 60 percent open; or, b) the measured oxygen concentration in the combustor exceeds the set point oxygen concentration. Conversely, when trim valve 35 closes to a position less than 30 percent open, valve 34 starts to step closed and continues to step closed until either: a) trim valve 35 opens to greater than or equal to 30 percent open; or b) the measured oxygen concentration in the combustor becomes less than the set point oxygen concentration. Typical oxygen concentration set points for the coal heating process in the pyrolyzer 12 are in the range of 0.2 percent to 0.8 percent.

It will be appreciated that, because neither the flow nor the hydrocarbon concentration of heated effluent stream 15 can be reliably measured, the amount of additional air required to burn the hydrocarbons in the lean fuel combustor 17 cannot be exactly calculated. With the two stage air flow control system 33, the exact amount of air flow is maintained without the need to know the incoming flow or gas composition of heated effluent stream 15. The staging between valve 34 and valve 35 is useful to provide accurate air flow control over a wide range of flows. In one embodiment, the combustion range for incoming hydrocarbon components from main pyrolysis 12 was from 0 to 36 million BTU per hour (0 to 38,000 mega Joules per hour). On a larger scale, this heat rate could range from 0 to 180 million BTU per hour (0 to 190,000 mega Joules per hour).

In addition to the primary controls just described, several anticipatory control functions can be used to maintain stability of the combustion process in the lean fuel combustor 17 and to maintain stability of the combustion gases 19 from the auxiliary fuel combustor 24. The pressure and flow of heated effluent stream 15 entering lean fuel combustor 17 may vary due to changes in the carbonaceous material bed depth in the main pyrolyzer 12, gas density changes caused by temperature fluctuations, and interactions between the multiplicity of process controls. Furthermore, changes in the hydrocarbon concentration are caused by variations in main pyrolyzer 12 and by conditions and quality of the carbonaceous material being processed in the pyrolyzer 12.

Changes in the pressure of hydrocarbon gas stream 14 tend to change the air flow into the combustor 17 by applying more or less back pressure to valves 34 and 35. These pressure changes may be mitigated in the following way. Air pressure is controlled by pressure control valve 40, which is operable to dissipate some of the airflow generated by air blower 21. The pressure of the lean fuel gas 15 is measured by a pressure analyzer 65. The pressure of the mixture of air and re-circulated gas 23 is measured by pressure transmitter 64. The pressure drop across air pre-heater 13 can be determined by air flow as measured at flow transmitter 38 for air supply stream 22. Re-circulated hot gas flow rate in flow path 18A can be determined by the position of control valve 60. From these measurements, a desired air pressure may be calculated so that a constant pressure differential is maintained across valves 34 and 35 and across the nozzles 44, where the air and gas mixture enters combustor 17. Pressure control valve 40 is opened or closed to maintain this calculated pressure at a second pressure analyzer 46. This provides a repeatable and stable relationship between air flow (flow path 22) and valve position for valves 34 and 35 and minimizes changes and corrections in the air flow. Thus, potential air flow changes are anticipated by pressure changes in the process and corrective action is taken by adjusting one valve, i.e. relief valve 40.

Alternatively, the air pressure in the system could be adjusted by the activation of the primary air source, i.e. variable speed blower 21, activated by a feedback from the pressure analyzer 46 and the calculated pressure. In this embodiment, frequent adjustments to and possible interactions between valves 34 and 35 are avoided.

A surge of very lean hydrocarbon gas in heated effluent stream 15 to the combustor will cause a rapid reduction in available fuel for the combustion reaction. A temperature drop or "crater" of over 700° F. (over 370° C.) may be seen in less than 30 seconds. A crater typically has an initial downward drift followed by a rapid temperature plunge. Following the temperature plunge, restart of combustion may not be possible without bringing down and restarting the pyrolyzer 12. This will lead to a temperature drop in the combustor exhaust 18, and a reduced supply of heat energy to pyrolyzer 12. The method of the present invention monitors the temperature of the lean fuel combustor 17 by the temperature element 29. If this temperature falls below a desired set point, the temperature set point for the heated effluent stream 15 is increased incrementally. This in turn forces more heat energy from the auxiliary fuel burner 24 through lean fuel heat exchanger 16 until the temperature of heated effluent stream 15 reaches its new set point as measured by temperature element 43. The result is a hotter effluent stream 15 entering lean fuel combustor 17. The combustion reaction therefore starts at a higher temperature, producing a higher temperature exhaust 18 as measured by temperature element 29. The control system repeats this process as required to restore the temperature of exhaust 18 and the amount of heat supplied to pyrolyzer 12. A surge of very rich hydrocarbon gas in stream 15 will produce the opposite effect, lowering the temperature set point.

When a drop of a predetermined number of degrees below a set point for heated effluent stream 15 is detected, an incremental increase in burner air and fuel is provided to the fossil fuel combustor 24 by the opening of burner air valve 51 and secondary air valve 53. Secondary air valve 53 is automatically opened to maintain the proper air-to fuel ratio as determined by flow transmitters 52 and 55. This initial pulse of heat to heat exchanger 16 increases the temperature of the heated effluent stream 15. This is followed by a stepwise closing of air valve 51, which is followed by fuel air valve 53, back to a valve position determined by temperature transmitter 29. This action typically will reverse the temperature drop in combustor 17. However, the condition usually associated with a temperature drop is observed to be an excess of hydrocarbon components in hydrocarbon gas stream 14 resulting in a rich condition in lean fuel combustor 17. While such adjustments are being made to alter the flow rate of burner exhaust 19, the lean fuel combustion oxygen is monitored at oxygen analyzer 28. If the oxygen concentration stays at 0 percent for a set period of time, air valve 34 is stepped open to provide a step increase of primary air flow. This increase is repeated if the concentration remains at 0 percent for another period of time.

In the pyrolyzer 12 for heating coal or oil shale, a crater is anticipated when a temperature drop of 50° F. below set point is detected. At this point, valve 51 is moved to a 70 percent open status closely followed by a corresponding opening of the fuel air valve 53 to provide a sensible heat pulse to the heat exchanger 16. This is followed immediately by a 1 percent closing of the valves 51 and 53 every five seconds until they reach the position currently called for at the temperature element 29. Additionally, if the oxygen concentration remains at substantially 0 percent for 15 seconds after the crater is detected, valve 34 is opened an additional 10 percent to raise the primary air flow in flow path 22. This action will repeat if the oxygen concentration remains at substantially 0 percent for an additional 15 seconds. Alternatively, if an optional combustibles detector 27 is connected to combustor 17, a low oxygen/high combustibles ratio (i.e. 0 percent oxygen and greater than 0.5 percent combustibles) may be used to trigger the opening of valve 34. It will be appreciated that the combustibles detection device 27 can be combined with the oxygen detector 28 in one device.

A final control scheme involves controlling the temperature of the combustor exit stream 18B just before the gases are introduced into the pyrolyzer 12 as shown at flow path 59. This control is achieved by sensing the final process gas temperature using temperature element 58 which feeds back a temperature signal to the controller 70. The controller 70 controls recycle valve 56 to regulate the amount of cooled process gas 41 that is introduced into combustor exit stream 18B to form gas flow path 59. It is to be understood that any suitable device can be used for measuring temperature, pressure or flow rate as required by the carbonaceous material processing system 10.

EXAMPLE 1

The fossil fuel combustor 24 is fired with 13,700 pounds per hour (6,210 kilograms per hour) of coal fines having a heating value of 7,190 BTU per pound (16.7 mega Joules per kilogram). The combustion gases 19 from the auxiliary fuel combustor 24 have a temperature of 2,100° F. (1,150° C.) as they enter the heat exchanger 16. This hot gas heats 159,000 pounds per hour (72,100 kilograms per hour) of the pyrolyzer effluent gases 14 from 190° F. to 1,500° F. (88° C. to 810° C.). The second heat exchanger 13 heats 141,000 pounds per hour (64,000 kilograms per hour) of lean fume combustion air 22 from 100° F. to 450° F. (38° C. to 230° C.). The portion of lean fuel combustor flue gas 18 re-circulated back to the combustor through valve 60 is 65,000 pounds per hour (29,000 kilograms per hour) at 3,200° F. (1,760° C.). The heated effluent stream 15 mixes with the hot combustion air and re-circulated gas 23 in the lean fuel combustor 17 where the gases are combusted to produce the hot process gas 18. The hot process gas 18 is at a temperature of 3,200° F. (1,760° C.), and contains less than detectible levels of hydrocarbons, and an oxygen concentration of 0.5 percent. The hot process gas stream 18B directed to the pyrolyzer 12 is tempered by mixing 1,800,000 pounds per hour of pyrolyzer off gas 41 through valve 56 to produce 2,100,000 pounds per hour of process on-gas 59 at a temperature of 620° F.

EXAMPLE 2

The auxiliary fuel combustor 24 is fired with 14,400 pounds per hour (6,530 kilograms per hour) of coal fines having a heating value of 7,190 BTU per pound (16.7 mega Joules per kilogram). The flow of combustion gases 19 from the auxiliary combustor is at a temperature of 2,000° F. (1,090° C.) as it enters the heat exchanger 16. This hot gas heats 163,000 pounds per hour (73,900 kilograms per hour) of pyrolyzer effluent gases 14 from 190° F. to 1,500° F. (88° C. to 820° C.). The heated effluent stream 15 mixes with the combustion air 22 in the lean fuel combustor 17 where the lean fuel is combusted to produce the hot process gas 18. The hot process gas is at a temperature of 3,000° F. (1,650° C.), and contains less than detectible levels of hydrocarbons, and an oxygen concentration of 0.5 percent. This hot process gas stream is directed toward the pyrolyzer 12 as flow stream 18B. These gases are tempered by mixing 1,800,000 pounds per hour (816,000 kilograms per hour) of processor off gas 41 to produce 2,100,000 pounds per hour (953,000 kilograms per hour) of process on-gas 59 at a temperature of 600° F. (315° C.).

EXAMPLE 3

The process described above in Example 1 was operated and the thermal value of the coal was measured both before and after the upgrading process. It was determined that the process was effective to raise the thermal value of the low calorific coal from a calorific content of less than or equal to about 8,000 BTU Permobil pound (18.6 mega Joules per kilogram) to a resulting stream of processed coal (coal char) having a thermal value of at least about 11,000 BTU Permobil pound (25.6 mega Joules per kilogram).

The principle and mode of operation of this invention have been described in its preferred embodiments. However, it should be noted that this invention may be practiced otherwise than as specifically illustrated and described without departing from its scope.

The invention claimed is:

1. A method of upgrading coal and other carbonaceous fuels comprising:

subjecting the carbonaceous fuel to a pyrolyzing process, thereby forming upgraded carbonaceous fuel and a flow of lean fuel gases;

directing the flow of lean fuel gases and a flow of primary combustion air into a lean fuel combustor;

combusting the lean fuel gases in the lean fuel combustor, thereby producing a gas stream of products of combustion;

introducing at least a portion of the gas stream into the flow of primary combustion air; and directing the remainder of the gas stream to the pyrolyzer, wherein at least about 60% of the heat provided to the pyrolyzer is provided by the combustion of the lean fuel gases from the pyrolyzer, with the remainder of the heat being provided by an auxiliary fuel combustor;

wherein the temperature of the lean fuel gases being introduced into the lean fuel combustor is controlled to be above the ignition temperature of an air-fuel mixture in the lean fuel combustor.

2. The method of claim 1 in which at least about 70% of the heat provided to the pyrolyzer is provided by the combustion of the lean fuel gases from the pyrolyzer, with the remainder of the heat being provided by the auxiliary fuel combustor.

3. The method of claim 1 in which the amount of heat provided to the pyrolyzer by the combustion of the lean fuel gases from the pyrolyzer is within the range of from about 70% to about 90%, with the remainder of the heat being provided by the auxiliary fuel combustor.

4. The method of claim 1 in which the temperature of the lean fuel gases being introduced into the lean fuel combustor is controlled to be at least about 50° F. (about 10° C.) above the ignition temperature of the air-fuel mixture in the lean fuel combustor.

5. The method of claim 1 in which the carbonaceous fuel is coal, and the treating of the coal is effective to raise the thermal value of low calorific coal having a calorific content of less than or equal to about 8,000 Btu/pound (18.6 MJ/kg) to a resulting stream of processed coal having a thermal value of at least about 11,000 Btu/pound (25.6 MJ/kg).

6. The method of claim 1 including indirectly heating the lean fuel gases with auxiliary fuel combustion gases without combining the lean fuel gases with the auxiliary fuel combustion gases.

7. The method of claim 1 in which the step of heating the lean fuel gases raises the temperature of the lean fuel gases entering the lean fuel combustor to a temperature above about 1400° F. (about 760° C.).

8. The method of claim 7 in which the step of heating the lean fuel gases raises the temperature of the lean fuel gases entering the lean fuel combustor to a temperature within the range of from about 1,400° F. to about 1,600° F. (about 760° C. to about 870° C.).

9. The method of claim 8 in which the step of heating the lean fuel gases raises the temperature of the lean fuel gases entering the lean fuel combustor to a temperature of about 1,500° F. (about 816° C.).

* * * * *